United States Patent Office 3,515,898
Patented June 2, 1970

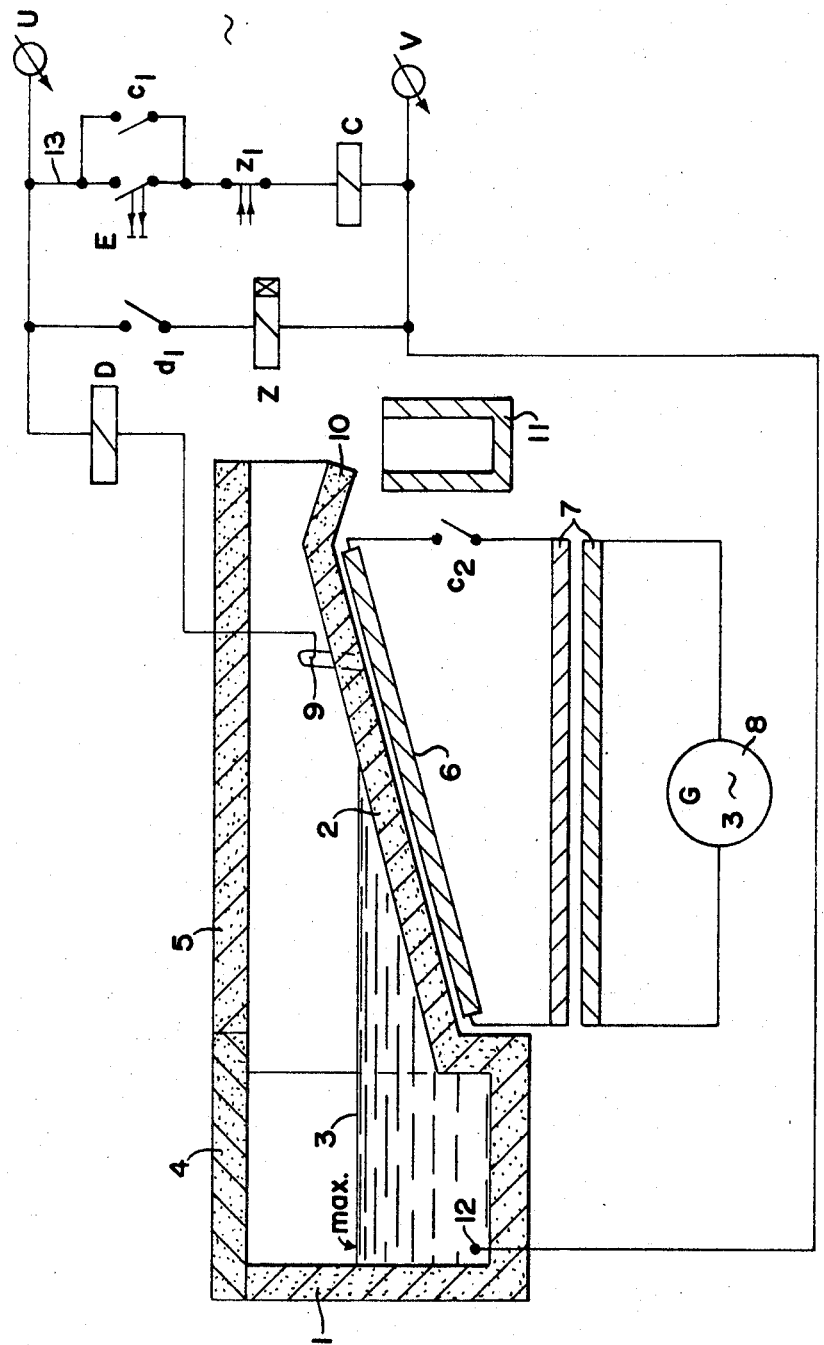

3,515,898
APPARATUS FOR POURING MEASURED QUANTITIES OF LIQUID METALS FROM AN ELECTROMAGNETIC CONVEYOR CHANNEL
Axel von Starck, Remscheid-Luttringhausen, Germany, assignor to AEG - Elotherm G.m.b.H., Remscheid-Hasten, Germany
Filed June 12, 1968, Ser. No. 736,417
Claims priority, application Germany, Oct. 20, 1967, A 57,139
Int. Cl. F04b 19/04
U.S. Cl. 307—118                                     6 Claims

ABSTRACT OF THE DISCLOSURE

An induction type liquid metal conveyor channel is provided with a contact for actuating a timer when the metal reaches a predetermined point in the channel. The timer is arranged to de-energize the conveyor after a predetermined time delay for delivery of a predetermined weight of metal. The invention is applied in induction type magnetic conveyors in which the rate of flow of the liquid metal in weight is constant for a constant energizing voltage.

DESCRIPTION

Metal melting or holding furnaces have been used with an induction type conveyor channel extending from the furnace for pouring or delivering liquid metals. In such apparatus as soon as the electrical power source for the inductor windings of the conveyor channel is switched on, liquid metal in the melting or holding vessel is transported. It travels along the channel and at the end of the channel it flows out of a pouring nozzle into a suitable container or mold.

The quantity of the liquid metal measured in weight transported per unit of time through the conveyor channel depends upon the voltage applied to the inductor, but not upon the height of the bath level inside the holding or melting vessel. By alteration of the voltage applied to the inductor, a change of the rate of flow of the liquid metal in the conveyor channel can be achieved.

During the delivery of a certain measured quantity of liquid metal from the holding or melting vessel, the inductor normally receives a constant voltage, whereby the liquid quantity flowing into the conveyor channel is transported to the end of the channel and poured over the pouring nozzle into a container. The metal quantity delivered into the container is proportional to the outflow time, that is with constant voltage the same quantity of liquid metal per time unit will be transported and poured off. Since the bath level in the vessel subsides after each metering of the molten metal according to the quantity of metal delivered, the metering time has heretofore had to be altered after each metering process, so that the same quantity of liquid metal is always poured out into the container. Under these circumstances the operator is required to readjust the time, which involves considerable additional work.

It is accordingly an object of the invention, to avoid such variations in metering times, depending on the bath level in the holding or melting vessel, so that the same quantity of liquid metal is always poured out of the electromagnetic conveyor channel. This is done by utilizing a predetermined metering time setting on the energizing switch for the electromagnetic conveyor channel. It will be understood that in such apparatus the conveyor channel is inclined upwardly from the liquid metal vessel so that the channel in effect lifts the molten metal. In carrying out the invention, uniformity in the quantity of liquid metal poured out is accomplished by mounting an electrode or contact in the inclined conveyor channel above the high point or maximum level of liquid metal in the bath. The electrode is arranged to operate an electrical time switch at the moment of contact with the liquid metal delivered through the conveyor channel. The time period, which is set at the time switch, determines the measured quantity of the liquid metal which is poured off.

A better understanding of the invention will be afforded by the following detailed description considered in conjunction with the accompanying drawing which is a schematic diagram representing schematically electrical circuits employed and showing the apparatus schematically, representing a section of the metal containing vessel and conveyor channel as cut by a vertical plane.

As shown in the drawing there is a holding or melting vessel 1 which has an upwardly inclined conveyor channel 2. Liquid metal 3 is present within the vessel 1 and within the lower part of the conveyor channel 2. The vessel 1 is designed for receiving metal up to the highest level referred to by the point MAX. In order to avoid radiation losses from the liquid metal 3, covers 4 and 5 are provided, respectively, for the vessel 1 and the conveyor channel 2. An inductor 6 is mounted under the conveyor channel 2. The inductor is of the conventional type analogous to what are sometimes called straightline, induction motor stators in which a polyphase electrical current produces a translational polyphase magnetic field traveling in the direction from the vessel 3 along the upwardly inclined conveyor channel 2, inducing currents in the molten metal in the channel for reacting therewith to produce upward forces in the particles of the molten metal and moving the metal in the upward direction of the channel, transversely to the magnetic field. Inductors for inducing flow of molten metal in conveyor channels by a translational polyphase magnetic field are described in my concurrently filed application Ser. No. 736,419 and in U.S. Pat. 3,288,069 granted to Michaux.

For energizing the inductor 6 through a schematically indicated polyphase transformer 7 a polyphase generator 8 is provided as indicated. By way of example, a 3 phase generator may be employed.

For controlling the application of current by the transformer 7 to the inductor 6, a control circuit is provided having terminals U and V adapted to be connected to a source of alternating current. The control circuit includes an electrode or contact 12 within the vessel 3 and an upper contact or electrode 9 in the metal conveying channel 2 at a point therein higher than the maximum level point MAX of the liquid bath. A time switch is provided having normally closed contacts $z_1$ for controlling the current supply from the transformer 7 to the inductor 6 and having a winding Z responsive to the aforesaid control circuit. Preferably a relay is provided having a winding D in series with the current source terminals U, V and the contacts or electrodes 9 and 12 and having a normally open contact $d_1$ in a circuit including the time switch or time delay relay winding across the current-source terminals U and V. It is understood that the time switch or relay is of the type in which the contact $z_1$ opens a predetermined length of time after energization of the winding Z. The time switch is preferably an adjustable type.

For energizing the inductor 6 when it is desired to deliver a fixed quantity of metal from a nozzle 10 beyond the end of the conveyor channel 2 into a container or ladle 11, a push-button type, energizing control switch E is provided together with a contactor controlled by the switch E, the contactor having a winding C and normally open contacts $c_1$ and $c_2$. The winding C is included in a circuit across the current source supply terminals U and V in series with the push button switch E and the normally-closed contacts $z_1$ of the time switch. Preferably normally-open, holding contacts $c_1$ actuated by the winding C are provided, the contact $c_1$ being connected across the push button switch E so that the inductor remains energized after the push button switch E has been released.

Before the push button switch E has been actuated, the contacts $c_1$, $c_2$ and $d_1$ are all open and the contacts $z_1$ are closed. Consequently the inductor 6 remains de-energized and the liquid 3 in the container or vessel 1 remains at the level illustrated in the drawing so that no liquid metal has reached the electrode 9. However, upon actuation of the push button switch E, a circuit is closed from the current supply source terminal U through a conductor 13, the switch E, the normally-closed, time switch contacts $z_1$ and the relay winding C back to the current source supply terminal V. The energization of the winding C thereby results in closing the contacts $c_1$ and $c_2$. The contact $c_1$ completes a holding circuit around the switch E, and the contact $c_2$ applies the power from the transformer 7 to the inductor 6. It will be understood that in practice the transformer 7 and the windings of the inductor 6 are polyphase windings so that the contacts $c_2$ are merely schematic and represent the requisite three-phase switch contacts for connecting the transformer 7 to the conductor 6.

The relay winding D remains de-energized until the inductor has transported liquid metal as far as the electrode 9, at which time the winding D is energized, closing the contact $d_1$. This energizes the winding Z of the time switch causing it to commence its prearranged time period of operation. At the expiration of this time period, which has been set for delivering the desired quantity of metal to the container 11, the time switch contact $z_1$ opens, thus de-energizing the winding C and opening the contacts $c_2$, thus de-energizing the inductor 6. Upon de-energization of the inductor 6 the liquid metal which has been resting in the conveyor channel 2 flows back into the vessel 1 and into the lower part of the conveyor channel 2 by gravity. Since the metal has flowed back there is no further contact with the electrode 9 and the control circuits remain de-energized. For delivering another measured quantity of metal the starter switch E is again actuated.

While the invention has been described as embodied in concrete form and is operating in a specific manner in accordance with the provisions of the patent statutes, it should be understood that the invention is not limited thereto, since various modifications will suggest themselves to those skilled in the art without departing from the spirit of the invention.

What is claimed is:

1. In apparatus for delivering fixed quantities of molten metal comprising in combination with a vessel for holding molten metal having an upwardly inclined channel extending from the vessel, means for inducing a magnetic field traveling along the channel in an upward direction to cause upward flow of metal in the channel and means for energizing the field inducing means, the improvement which comprises:
   period after actuation of said mechanism, and
   (a) timing mechanism operative to de-energize said magnetic field-inducing means a predetermined time
   (b) means associated with said channel for initiating operation of said timing mechanism when flowing metal reaches a fixed point in said channel.

2. The improvement described in claim 1 wherein said associated means is a member located in said channel.

3. The improvement described in claim 2 wherein said associated means is an electrode located in said channel.

4. The improvement described in claim 3 wherein a second electrode is provided at a lower level than the first mentioned electrode and a control circuit is provided having electrical connections to said electrodes, the timing mechanism having an operative connection to said control circuit for rendering the timing mechanism responsive to electrical contact between said first mentioned electrode and metal in the channel.

5. Apparatus as described in claim 4 wherein the field energizing means has an electrical supply circuit, the timing mechanism has an electrical winding and a normally closed contact which opens after a predetermined time delay,
   a relay is provided having a winding in the control circuit in series with the electrodes therein and has a pair of normally open contacts connected in series with the timing mechanism winding and the control circuit current source terminals.

6. Apparatus as described in claim 5 wherein the induction conveyor channel energizing means has an electrical supply circuit,
   a holding circuit is provided connected to the control circuit current source terminals, the holding circuit including a normally open energizing switch and the normally closed contacts of the timing mechanism, and
   a holding relay is provided having a winding in series with the holding circuit, normally open contacts bridging the energizing switch and normally open contacts in the electric supply circuit for the induction type conveyor channel, whereby closure of the energizing switch actuates the conveyor channel to lift liquid metal from the vessel toward the electrode in the conveyor channel, and the closure of a circuit through the electrode in the conveyor channel, when the liquid metal reaches it, initiates action of the timing mechanism and interruption of the electric supply circuit of the field energizing means after the timing mechanism has been energized for a pre-determined length of time.

References Cited

UNITED STATES PATENTS 3,107,705  10/1963  Isserstedt _____ 222—70 X
3,431,432  3/1969  Lofstrand et al. _____ 307—141

ROBERT K. SCHAEFER, Primary Examiner

T. B. JOIKE, Assistant Examiner

U.S. Cl. X.R.

103—1

UNITED STATES PATENT OFFICE
CERTIFICATE OF CORRECTION

Patent No. 3515898                       Dated June 2, 1970

Inventor(s) Axel von Starck

It is certified that error appears in the above-identified patent and that said Letters Patent are hereby corrected as shown below:

Column 3, line 58, cancel "period after actuation of said mechanism, and"; at the end of column 3 re-insert the line -- period after actuation of said mechanism, and --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents